United States Patent
Thain et al.

(10) Patent No.: US 7,912,947 B2
(45) Date of Patent: Mar. 22, 2011

(54) MONITORING ASYNCHRONOUS TRANSACTIONS WITHIN SERVICE ORIENTED ARCHITECTURE

(75) Inventors: William Stewart Robson Thain, West Lothian (GB); Michael J. Goulet, Newton, MA (US); Venkata Naresh Chippada, Santa Clara, CA (US); Raghuram Doddapaneni, Hyderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 404 days.

(21) Appl. No.: 12/037,706

(22) Filed: Feb. 26, 2008

(65) Prior Publication Data
US 2009/0216874 A1 Aug. 27, 2009

(51) Int. Cl.
*G06F 15/173* (2006.01)
(52) U.S. Cl. .................................................. 709/224
(58) Field of Classification Search .......... 709/223–226; 719/318
See application file for complete search history.

(56) References Cited

U.S. PATENT DOCUMENTS

| 7,689,688 | B2 * | 3/2010 | Iwamoto | 709/224 |
| 2005/0235058 | A1 * | 10/2005 | Rackus et al. | 709/224 |
| 2007/0113031 | A1 * | 5/2007 | Brown et al. | 711/160 |
| 2007/0150574 | A1 * | 6/2007 | Mallal et al. | 709/223 |
| 2007/0168493 | A1 * | 7/2007 | Sarwono et al. | 709/224 |

* cited by examiner

Primary Examiner — Joseph E Avellino
Assistant Examiner — Chirag Patel
(74) Attorney, Agent, or Firm — Vierra Magen Marcus & DeNiro LLP

(57) ABSTRACT

A monitoring system is used to monitor extended business transactions comprised of asynchronous messages. Each message may be a request or a response of an application transaction request-response pair and may be identified with a unique identifier. The unique identifier may be used to identify two or more asynchronous messages, where each extended business transaction may be associated with one or more unique identifiers to identify messages that comprise the business transaction. The extended business transactions are completed over an extended period of time and implemented over several different machines which may or may not be in communication with each other are monitored. Alerts are generated when messages of the extended business transaction do not satisfy a threshold or other criteria, such as a time period for occurring. A user interface or other mechanism may be used to configure the transactions and provide information regarding the status of the transactions and alerts generated for uncompleted portions of the transaction.

11 Claims, 15 Drawing Sheets

| content_monitor | |
|---|---|
| PK | content_monitor_id: int |
| | content_monitor_name: nvarchar<br>xpath_statement: nvarchar<br>analysis_type: tinyint<br>action: tinyint<br>operation_id: integer (FK)<br>etx_content_extractor_id: interger (FK) |

| etx_content_extractor | |
|---|---|
| PK | etx_content_extractor_id: integer |
| | extractor_field: nvarchar<br>sequence_number: integer<br>etx_monitor_id: integer (FK) |

| etx_monitor | |
|---|---|
| PK | etx_monitor_id: integer |
| | etx_monitor_name: nvarchar<br>severity1_threshold: integer<br>severity2_threshold: integer<br>severity3_threshold: integer<br>expiry_threshold: integer<br>nr_elements: integer |

| etx_track_log | |
|---|---|
| PK | etx_track_log_id: integer |
| | etx_monitor_id: integer<br>identifier: nvarchar<br>observation_type: integer<br>transaction_id: nvarchar<br>sequence_number: integer<br>request_time: bigint<br>expiry_time: bigint<br>severity1_alerted: numeric<br>severity2_alerted: numeric<br>severity3_alerted: numeric |

Figure 5

Overview | Services | Alerts | Catalog | Dependencies | XPath Library | Security | Reports | Configure | Help | Logout Services Main > Service Detail

Extended Transaction Monitor Configuration ( Test Mode )

- ∗ = Required
- ∗ Name [ ]
- ∗ Expiry Threshold [ 336 ] secs

Service Group [ ▼ ]

▶ FlowerDeliverer
▶ LotusFlorist

[ << Add Operation ]

☐ Add Dependency

Current Operations

| ✓ | Seq # | Operation Name | Operation NameSpace | XPath Name | Transaction ID | Analysis Type | Action |
|---|---|---|---|---|---|---|---|

[ Remove Selected Operations ]

Monitor Threshold Configuration

| Level | Current Value |
|---|---|
| • 3 ( Low ) | [ 12 ] secs |
| • 2 ( Medium ) | [ 24 ] secs |
| • 1 ( High ) | [ 36 ] secs |

[ Save ]  [ Cancel ]

MONITORING ASYNCHRONOUS TRANSACTIONS WITHIN SERVICE ORIENTED ARCHITECTURE

BACKGROUND

The growing presence of the Internet as well as other computer networks such as intranets and extranets has brought many new applications in e-commerce and other areas. Organizations increasingly rely on such applications to carry out their business or other objectives, and devote considerable resources to ensuring that the applications perform as expected. To this end, various application management techniques have been developed.

Modern information systems are distributed over several computers. One type of information system is a service oriented architecture (SOA) system. In a SOA system, also considered a web services system, users of services provided by machines are typically other computers. Monitoring of SOA systems is important to provide reliable services as part of the SOA service.

Some transactions implemented over an SOA system are not suitable to be monitored by traditional system monitoring systems. Traditional transactions consist of a request and an immediate response generated in response to the request. The request and response typically occur between the same two machines. Some SOA system business transactions consist of asynchronous messages sent between different machines. In this case, it is possible that no one application or machine sees all request and response messages which comprise the business transaction. Additionally, the messages may occur over a span of several days, making it more difficult for existing monitoring systems to accurately track these business transactions.

SUMMARY

The present technology provides a monitoring system for monitoring and reporting data for extended business transactions. An extended business transaction may be asynchronous, completed over an extended period of time and implemented over several different machines which may or may not be in communication with each other. In some embodiments, the monitoring system may monitor a service oriented architecture (SOA) system and provide alerts when portions of the extended business transaction do not satisfy a threshold or other criteria. A user interface or other mechanism may be used to provide information regarding the status of the extended business transaction and alerts generated for uncompleted portions of the transaction.

Extended business transactions are comprised of two or more messages that are part of different application transactions. Each message may be a request or a response of an application transaction request-response pair and may be identified with a unique identifier. The unique identifier may be used to identify two or more asynchronous messages, where each extended business transaction may be associated with one or more unique identifiers to identify messages that comprise the business transaction. The messages may be sent or received from different applications and occur over a time period of several hours, days or some other time period.

An embodiment may define a first business transaction as having two or more messages. The two or more messages may occur asynchronously an each be part of an application transaction. The embodiment also detects whether any of the two or more messages occur and correlate performance data for any of the two or more messages that have occurred. Results are then reported for the performance of the business transaction.

An embodiment may define a first asynchronous business transaction having two or more messages and transmit message monitoring parameters to one or more applications to detect the two or more messages sent or received by the applications. Performance data can then be correlated for the two or more messages. Data is reported based on the correlated performance data.

An embodiment may comprise an agent, repository and transaction manager for monitoring a transaction. The agent may monitor an application and detect asynchronous messages sent or received by the first application that have a recognized unique identifier. The repository may include data records, message definition data and message instance data. The data records may relate to defined extended business transactions. The message definition data may define each extended business transaction. The message instance data may exist for one or more of the defined messages. Each extended business transaction associated with at least one unique identifier may be used to identify messages that correspond to the extended business transaction. The transaction manager may correlate message instance data for an extended business transaction based on the occurrence of one of the unique identifiers in the message instance data.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 5 is an example of table schema used to define and monitor extended business transactions.

FIG. 14 is an example of an interface for defining an extended business transaction.

FIG. 15 is an example of an interface for configuring one or more operations to detect one or more messages which comprise an extended business transaction.

FIG. 16 is an example of an interface for displaying information for an extended business transaction being monitored.

DETAILED DESCRIPTION

A monitoring system monitors and reports data for extended business transactions. An extended business transaction may be comprised of asynchronous messages that occur over an extended period of time by servers and/or machines which may or may not be in communication with each other. In some embodiments, the monitoring system may monitor a service oriented architecture (SOA) system and provide alerts when portions of the extended business transaction do not satisfy a threshold or some other criteria. A user interface or other mechanism may be used to define, modify, set thresholds for and provide monitoring information regarding extended business transactions and alerts generated for uncompleted portions of the transaction.

Each of the two or more messages comprising an extended business transaction may be the request or response of a request-response pair associated with a transaction performed by an application. Each request or response message may be associated with a different application transaction. For example, a first message may be a request received by a first application and the second message may be a response sent as part of a different application transaction, either by the same or a different application. The messages may be separated by an extended period of time, such as several minutes, hours or even days.

At least two or more messages in an extended business transaction are identified by a unique identifier. Each unique identifier may be used to identify two or more asynchronous messages within the transaction, where each extended business transaction may be associated with one or more unique identifiers. Thus, an extended business transaction may be comprised of three messages, where a first unique identifier is contained in (and therefore identifies) the first message and second message and the second unique identifier is contained in the second and third message.

In some embodiments, monitoring parameters and other data may be received by the monitoring system. The received parameters may be used to configure monitoring of one or more applications for messages that comprise an extended business transaction and for setting alerts and/or other messages for portions of an uncompleted transaction or the transaction as a whole. In some embodiments, the monitoring system may provide a user interface for receiving monitoring parameters and/or other data and providing monitoring information regarding extended business transactions to a user.

Figure 1:
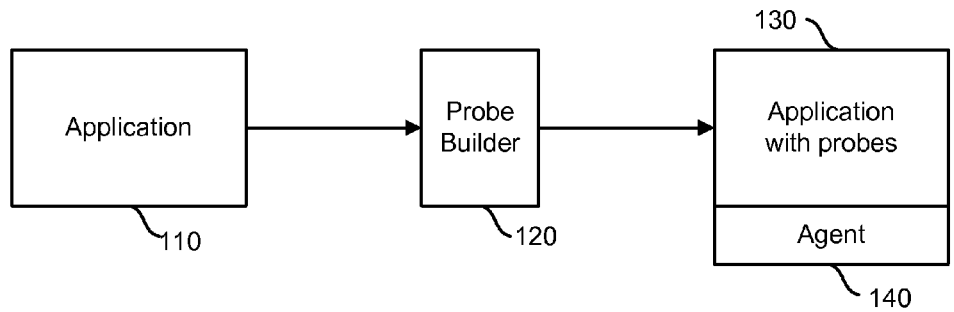
FIG. 1 is a block diagram showing how byte code for an application is instrumented.

In one embodiment, the technology herein can be used to monitor behavior of an application on an application server using bytecode instrumentation. The technology herein may also be used to access information from the particular application. To monitor the application, an application management tool may instrument the application's object code (also called bytecode). FIG. 1 depicts an exemplar process for modifying an application's bytecode. FIG. 1 shows Application 110, Probe Builder 120, Application 130 with probes and Agent 140. Application 130 includes probes used to access information from the application, and application 110 is the application before the probes are added. Application 110 can be a Java application or a different type of application.

Probe Builder 120 instruments (e.g. modifies) the bytecode for Application 110 to add probes and additional code to Application 110 in order to create Application 130. The probes may measure specific pieces of information about the application without changing the application's business logic. Probe Builder 120 also generates Agent 140. Agent 140 may be installed on the same machine as Application 130 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2:
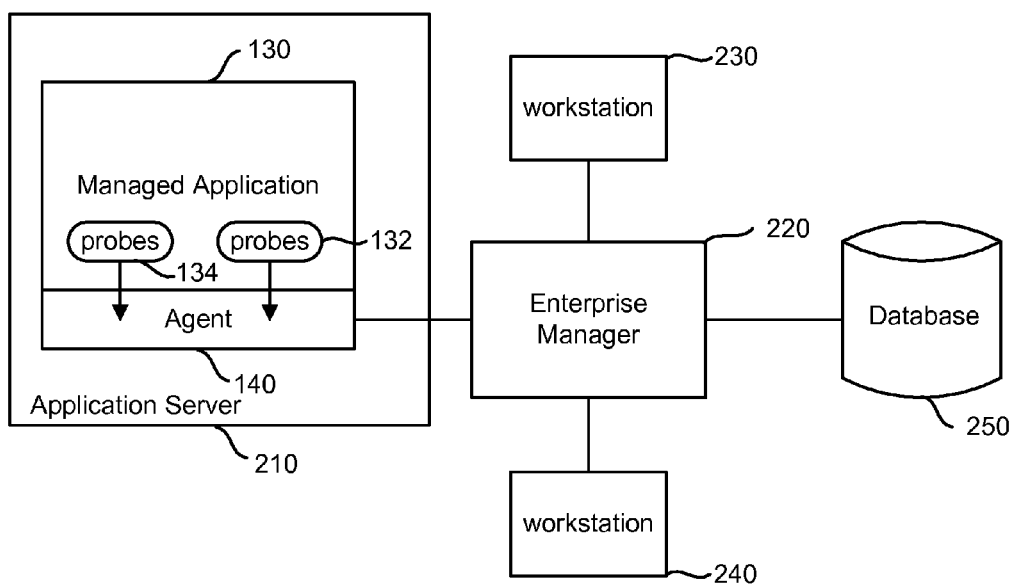
FIG. 2 is a block diagram of an embodiment of a system for monitoring an application.

FIG. 2 is a conceptual view of the components of the data reporting technology. In addition to managed Application 140 with probes 132 and 134, FIG. 2 also depicts Enterprise Manager 220, database 250, workstation 230 and workstation 240. As a managed application runs, probes (e.g. 132 and/or 134) relay data to Agent 140. In one embodiment, probes 132 and 134 may be implemented in objects and other code that write data, change data or otherwise cause the state of an application server to change. Agent 140 then collects, summarizes and sends the data to Enterprise Manager 220. In some embodiments, Agent 140 may perform additional actions, such as invoking a method on another application, performing initialization tasks, and other actions. This is discussed in more detail below.

Enterprise Manager 220 receives performance data from managed applications via Agent 140, runs requested calculations, makes performance data available to workstations 230-240 and optionally sends performance data to database 250 for later analysis. The workstations (e.g. 124 and 126) provide the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In one embodiment, workstations 230-240 and database 250 are not used or needed to generate synthetic transactions.

In one embodiment of the system of FIG. 2, each of the components is running on different machines. That is, workstation 230 is on a first computing device, workstation 240 is on a second computing device, Enterprise Manager 220 is on a third computing device, and Managed Application 130 is running on a fourth computing device. In another embodiment, two or more (or all) of the components are operating on the same computing device. For example, Managed Application 130 and Agent 140 may be on a first computing device, Enterprise Manager 220 on a second computing device and a workstation on a third computing device. Alternatively, all of the components of FIG. 2 can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 3:
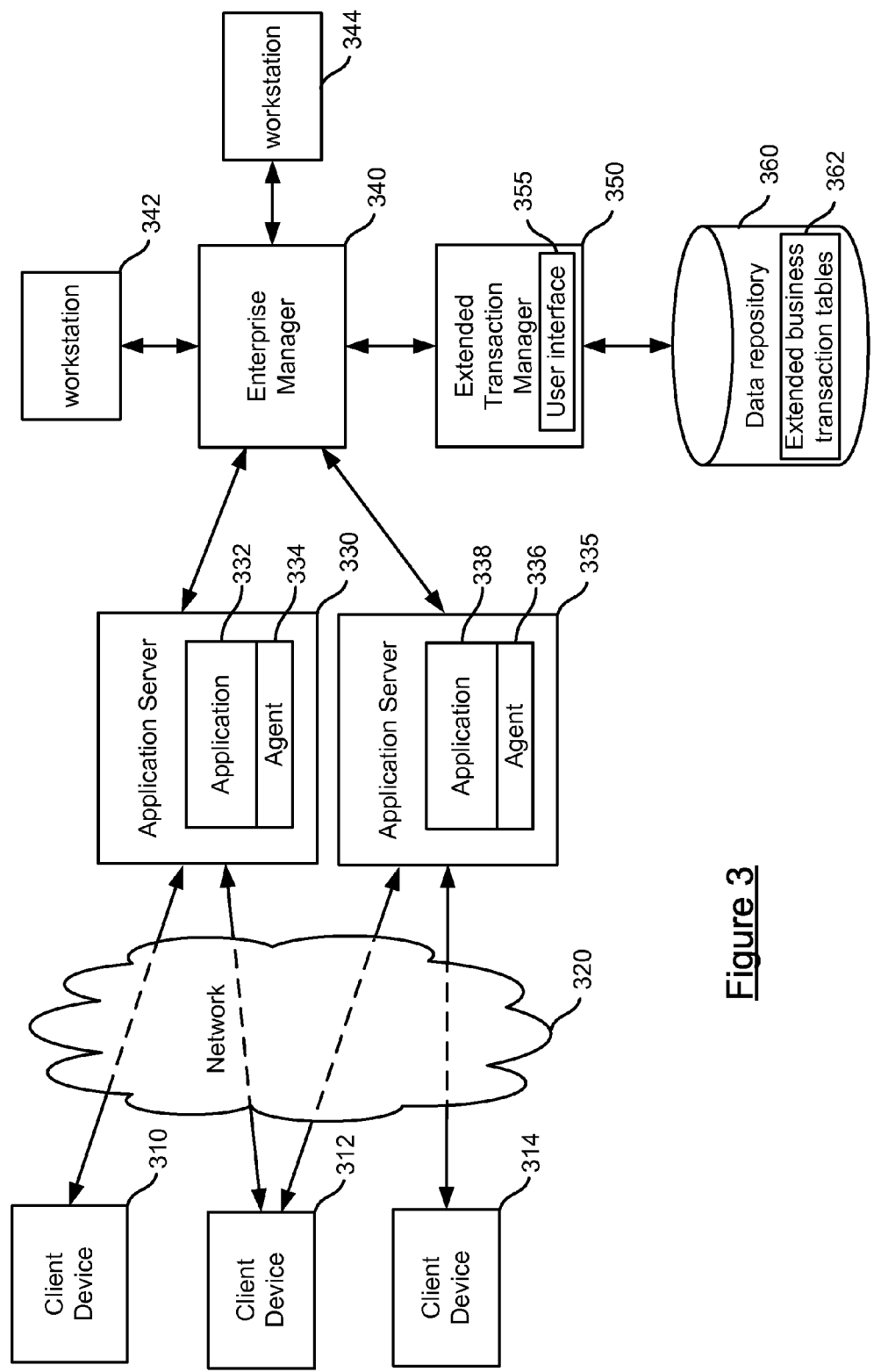
FIG. 3 is a block diagram of an embodiment of a system for monitoring an extended business transaction.

FIG. 3 is a block diagram of an embodiment of a system for monitoring an extended business transaction. The system of FIG. 3 includes devices 310, 312 and 314, application servers 330 and 335, enterprise manager 340, work stations 342-344, extended business transaction manager 350 and data repository 360.

Client devices 310-314 may be implemented as a client computer, and application server, or any other device which may communicate to request a transaction from or generate a response to a request from an application server. For example, the devices may be smart clients, application servers that provide a web service, remote machines, or some other device that communicates with an application on application server 330. An example of a machine which may implement client device 310-314 may include a vending machine which communicates with a web service, a banking system web service, or any other machine or service that communicates over a network with application server 330.

Client device 310 may communicate with application server 330, client device 314 may communicate with application server 335, and client device 312 may communicate with both application servers 330 and 335 over network 320. Network 320 may be the Internet or another WAN, LAN, internet, extranet, private network or some other network over which data may be communicated between two or more machines.

Application server 330 provides a web service over network 320 and includes application 332 and agent 334. Application server 335 includes application 338 and agent 336. Agent 334 and agent 336 may communicate with enterprise manager 340 to receive monitoring parameters, such as XPath expressions, and provide monitoring results to enterprise manager 340. In some embodiments, applications 332 and 334 and agent 334 and 336 are the same as those illustrated in the system of FIG. 2. Though only two applications and application servers are shown in FIG. 3, more or less than two application servers and/or applications may be used to implement a system for monitoring extended business transactions.

Enterprise manager 340 may receive data from one or more agents, process the data, and provide the data to extended transaction manager 350. In some embodiments, the processed data may be provided to any of workstations 342-344 for reporting to a user. Enterprise manager and work stations 342-344 may be implemented as those illustrated in the system of FIG. 2.

Extended business transaction monitor 350 may communicate with enterprise manager 340 and data repository 360 and handles creation and management of extended business transaction data. In particular, manager 350 provides a user interface 355 for correlating data and creating, editing and reporting alerts and other results of extended business transaction monitoring. In some embodiments, data and graphics for user interface 355 can be provided to a user through one of work stations 342-344 by extended business transaction manager 350. In this case, the manager provides information for the graphics to a work station so that the work station may implement the user interface. Examples of user interface for creating and reporting data are discussed below with respect to FIGS. 13-16.

Data repository 360 stores extended business transaction definition data, monitoring data, run time performance data, and other data related to the definition and monitoring of extended business transactions. In some embodiments, the data may be stored in extended business transaction tables 362. In particular, the tables may define an extended business transaction, the messages that comprise the transaction, the detected data as it is reported by one or more agents and other data. An example of a scheme for extended business transaction tables 362 is discussed in more detail below with respect to the tables illustrated in FIG. 5.

Figure 4:
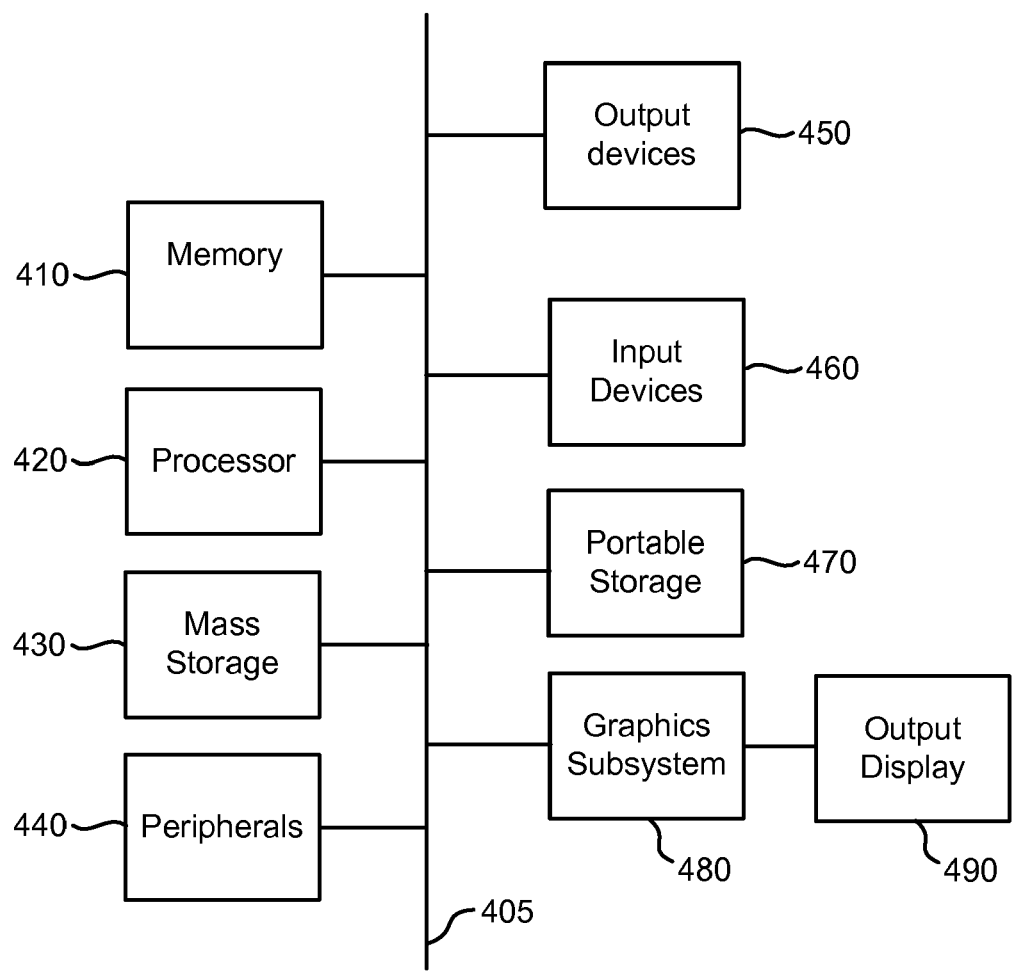
FIG. 4 is a block diagram of an embodiment of a computing system.

FIG. 4 is a block diagram of an embodiment of a computing system. In some embodiments, the computing system of FIG. 4 is used to implement devices 310-312, servers 314 and 330, enterprise manager 340, work stations 342-344, extended business transaction manager 350 and data repository 360.

The computer system of FIG. 4 includes one or more processors 420 and main memory 410. Main memory 410 stores, in part, instructions and data for execution by processor unit 420. If the system of the present invention is wholly or partially implemented in software, main memory 410 can store the executable code when in operation. The system of FIG. 4 further includes a mass storage device 430, peripheral device(s) 440, output devices 450, user input device(s) 460, portable storage medium drive(s) 470, a graphics subsystem 480 and an output display 490. For purposes of simplicity, the components shown in FIG. 4 are depicted as being connected via a single bus 405. However, the components may be connected through one or more data transport means. For example, processor unit 420 and main memory 410 may be connected via a local microprocessor bus, and the mass storage device 430, peripheral device(s) 440, portable storage medium drive(s) 470, and graphics subsystem 64 may be connected via one or more input/output (I/O) buses. Mass storage device 430, which may be implemented with a magnetic disk drive or an optical disk drive, is a non-volatile storage device for storing data and instructions for use by processor unit 420. In one embodiment, mass storage device 430 stores the system software for implementing the present invention for purposes of loading to main memory 410.

Portable storage medium drive 470 operates in conjunction with a portable non-volatile storage medium, such as a floppy disk, to input and output data and code to and from the computer system of FIG. 4. In one embodiment, the system software for implementing the present invention is stored on such a portable medium, and is input to the computer system via the portable storage medium drive 470. Peripheral device(s) 440 may include any type of computer support device, such as an input/output (I/O) interface, to add additional functionality to the computer system. For example, peripheral device(s) 440 may include a network interface for connecting the computer system to a network, a modem, a router, etc.

User input device(s) 460 provides a portion of a user interface. User input device(s) 460 may include an alpha-numeric keypad for inputting alpha-numeric and other information, or a pointing device, such as a mouse, a trackball, stylus, or cursor direction keys. In order to display textual and graphical information, the computer system of FIG. 4 includes graphics subsystem 480 and output display 490. Output display 490 may include a cathode ray tube (CRT) display, liquid crystal display (LCD) or other suitable display device. Graphics subsystem 480 receives textual and graphical information, and processes the information for output to display 490. Additionally, the system of FIG. 4 includes output devices 450. Examples of suitable output devices include speakers, printers, network interfaces, monitors, etc.

The components contained in the computer system of FIG. 4 are those typically found in computer systems suitable for use with the present invention, and are intended to represent a broad category of such computer components that are well known in the art. Thus, the computer system of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

FIG. 5 is an example of a schema for a set of tables used to define and monitor extended business transactions. The table schema in FIG. 5 provides more information for tables 362 in repository 360 of the system of FIG. 3 and describes a content monitor table, content extractor table, monitor table and tracking log table. The transaction content extractor and transaction monitor tables contain the definition of one or more extended transaction monitors. The content monitor table holds a definition of a content monitor. In some embodiments, a content monitor is a mechanism used to implement an XPath expression to extract data.

The content monitor table stores word definitions used to extract business transaction unique identifiers. The content monitor table includes a public key of content monitor ID, and fields of content monitor name, XPath statement, analysis type, action, operation ID, severity level, operation group ID and transaction content extractor ID. The content monitor ID is an automatically generated unique identifier internal to the data model. A content monitor name is a user chosen name for a content monitor to help a user remember what the monitor does. The XPath statement is an actual XPath expression that is transmitted to the agent from extended business transaction monitor 350 to be run against observed messages by the agent. The analysis type instructs the agent to execute the XPath expression against a request message, a response message or both. The action instructs the agent what action to take as a result of the XPath expression. In some embodiments, the action involves placing the result of the XPath expression into a particular field of a record sent to extended business transaction manager 350. The operation ID is a reference into a catalog of web service operations that identifies the specific web service operation that the XPath expression is run against. The transaction content extractor ID is a reference to the content extractor record contained in the transaction content extractor table.

The transaction content extractor table contains one record for each message operation defined as part of an extended business transaction. The table includes a public key of transaction content extractor ID and fields of extractor field, sequence number and transaction monitor ID. The transaction content extractor ID is an automatically generated unique identifier internal to the data model. The extractor field is a name of a field in the agent to manager communications message containing the extracted business transaction identifier. The sequence number field contains the position in the sequence that a particular message or operation used to detect a message. The transaction monitor ID is a reference to the transaction monitor table to the parent record.

The transaction monitor table contains one record for each extended business transaction defined by a user. The table includes a public key of transaction monitor ID, and fields of transaction monitor name, severity one threshold, severity two threshold, severity three threshold, expiry threshold and the number of elements. The transaction monitor ID is an automatically generated unique identifier internal to the data model. The transaction monitor name is a user chosen name for the extended transaction monitor. A severity one threshold is the permitted elapsed time before the absence of the next element reaches the first severity level which results in an alert. The severity two threshold and severity three threshold are both associated with a permitted elapsed time before the absence of the next element reached the second severity level and third severity level, respectively, which would result in an alert. The expiry threshold is the permitted elapsed time before records pertaining to incidences of the transaction monitored by this particular record are purged from the tracking log table. The number of elements indicates the number of elements in the defined extended business transaction.

The transaction tracking log table contains a record for each detected instance of a defined extended business transaction message. The records are added to the table as they are received from the enterprise manager through one or more agents. The table includes a public key of transaction track log ID and fields of transaction monitor ID, identifier, observation type, transaction ID, sequence number, request time, expiry time, severity one alerted, severity two alerted and severity three alerted. In some embodiments, a background thread runs a query against the table to determine if any of the messages have breached a severity level. This is described in more detail below.

The transaction track log ID is an automatically generated unique identifier internal to the data model. The transaction monitor ID field is a reference into the record of the transaction monitor table that defines the extended business transaction that the message instance or element instance belongs to. The identifier field contains a value of a business transaction identifier extracted by the agent from the web service message. This identifier is a unique identifier for this message and is used to detect messages sent and received by an application. The observation type field records where a web service message was observed. A transaction ID is a reference into the transaction logging subsystem of the SOA manager. The sequence number is the position of the current message instance in an extended business transaction sequence. The request time is the time at which the agent observed that particular message. The expiry time is the time at which the record would have reached the extended business transaction expiry threshold and will be purged from the transaction track log table. Severity one alerted, severity two alerted and severity three alerted are Boolean values which are set to true once the particular severity level alert has been triggered.

Figure 6:
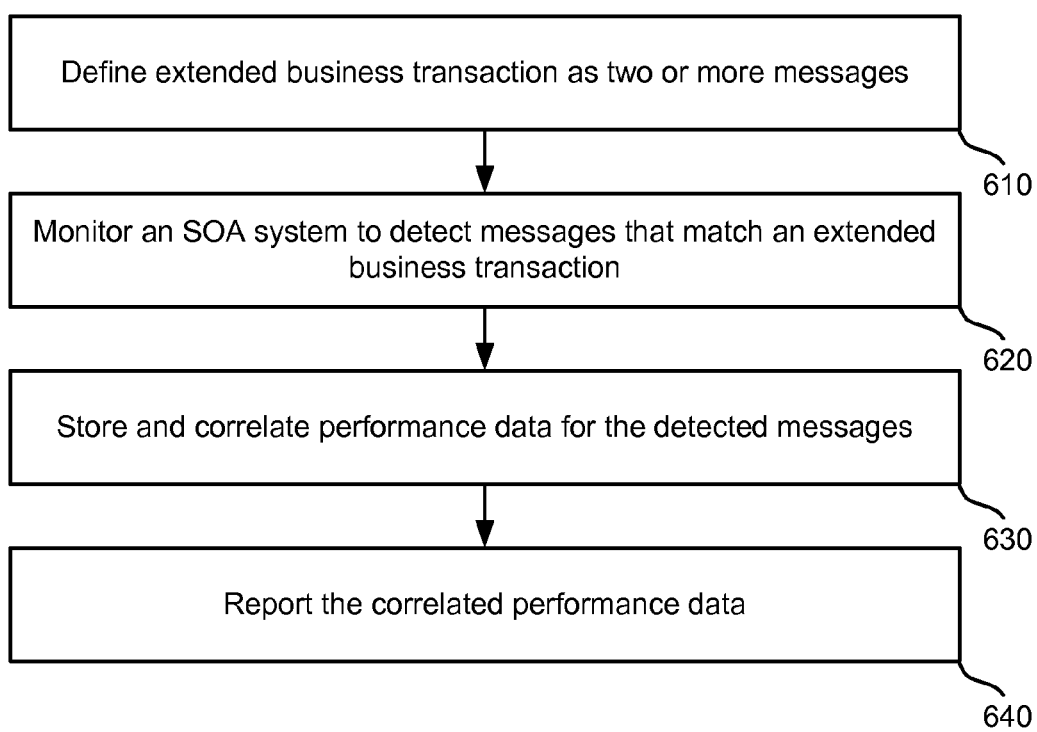
FIG. 6 is a flow chart of an embodiment of a method for monitoring an extended business transaction.

FIG. 6 is a flow chart of an embodiment of a method for monitoring an extended business transaction. First, an extended business transaction is defined as two or more messages at step 610. The transaction can be defined through user interface 350 provided by extended business transaction manager 350. An extended business transaction is defined as two or more messages at step 610. Defining an extended business transaction as two or more messages may include defining properties for the overall extended business transaction as well as the messages which comprise the transaction. The data used to define the transaction and corresponding messages is stored in the tables discussed above with respect to FIG. 5. Defining an extended business transaction as two or more messages is discussed in more detail below with respect to the method of FIG. 7.

After defining the extended business transaction, the system may monitor an SOA system to detect messages that match the defined extended business transaction at step 620. In some embodiments, monitoring the system and detecting messages begins with transmitting rules to one or more agents that monitor applications involved in the extended business transaction. Each agent applies the received rules to messages sent and/or received by the application that the agent is monitoring. Monitoring an SOA system to detect messages that match an extended business transaction is discussed in more detail below with respect to the method of FIG. 8.

Performance data is stored and correlated for the detected messages at step 630. The data may be stored in extended business transaction tables 362 as records. In some embodiments, the status of unfinished transactions is configured using one or more time thresholds as part of correlating performance data. Correlating performance data may include removing expired data which has been stored by the system. Storing and correlating performance data for the detected messages is discussed in more detail below with respect to the method of FIG. 10. Next, correlated performance data is reported at step 640. The data may be reported through user interface 355 as a result of a user input received through the interface, for example in response to receiving a selection through the interface of an extended business transaction to provide results for. The correlated data can be retrieved by extended transaction manager 350 from extended business transaction tables 362 in response to receiving user input indicating which extended business transaction to report data for. Reporting correlated performance data through an interface is discussed in more detail below with respect to the method of FIG. 10. In some embodiments, the correlated performance data may be reported in other ways, including but not limited to reporting via email, pager, mobile device text and graphic messages, a printer, fax, and other communication mechanisms.

Figure 7:
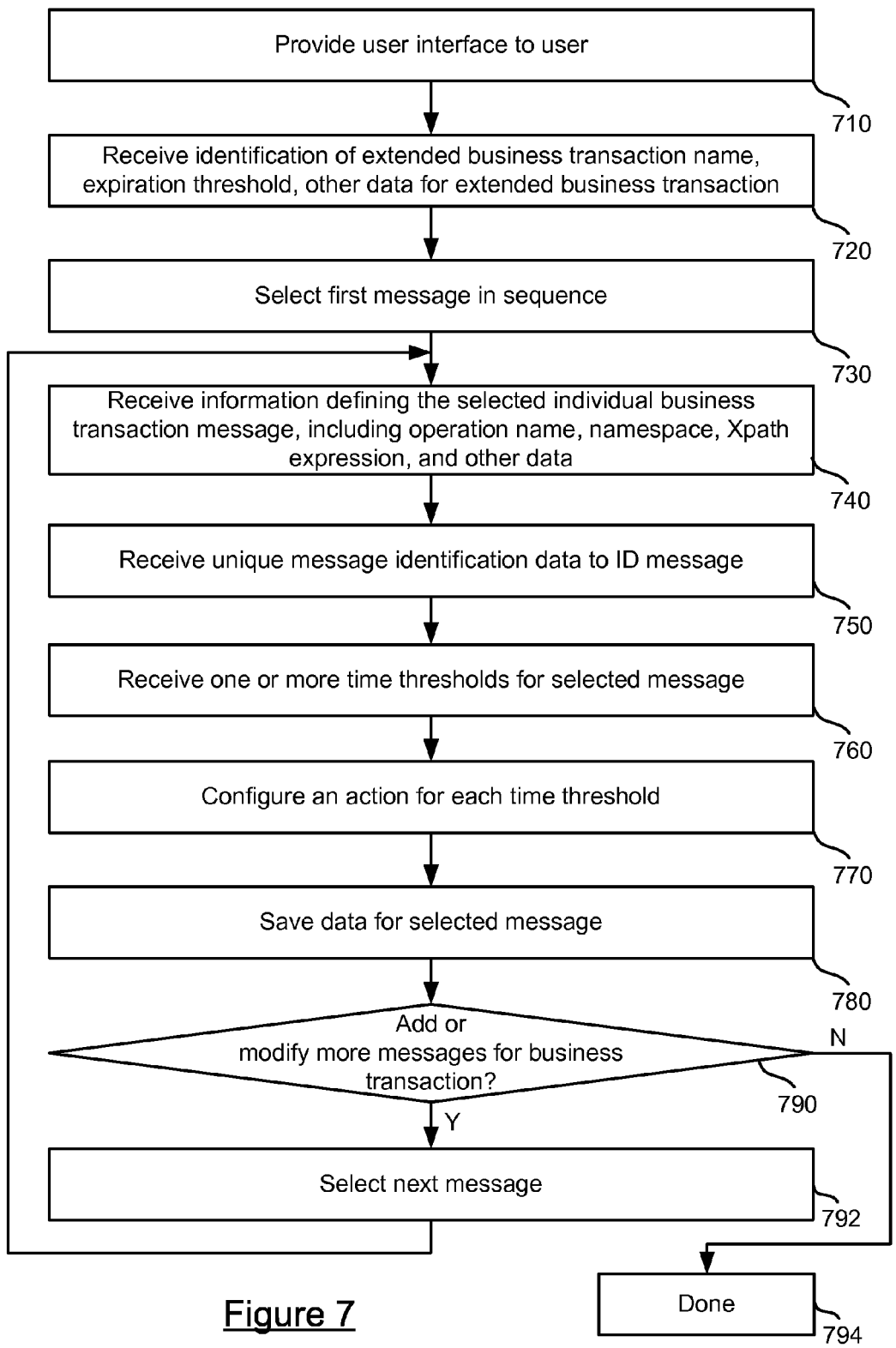
FIG. 7 is a flow chart of an embodiment of a method for defining an extended business transaction.

FIG. 7 is a flow chart of an embodiment of a method for defining an extended business transaction. In some embodiments, the method of FIG. 7 provides more detail for step 610 of the method of FIG. 6. First, a user interface is provided to a user at step 710. The user interface may be interface 355 of extended business transaction manager 350, an interface provided through one of workstations 342-344, or some other interface. Next, extended business transaction data is received at step 720. The extended business transaction data may include the transaction name, expiration threshold and other data for the extended business transaction. The expiration threshold indicates when data for the extended business transaction is removed or purged from a database such as data repository 360. The extended business transaction name may be any name provided for the transaction by a user. In some embodiments, a user interface such as that illustrated in FIG. 14 may be used to receive extended business transaction data.

After receiving extended business transaction data, a first message in a sequence for an extended business transaction is selected to be configured at step 730. In some embodiments, selecting a first message may include selecting the "add operation" button in the interface of FIG. 14. After selecting a first message to be configured in a sequence, information is received which defines the individual business transaction message at step 740. The received information may include operation or message name, name space, XPath expression, and other data for the message. The operation name and name space may be used to filter intercepted application messages (requests and responses) from being considered as candidates to compare to a message unique identifier. In some embodiments, only message that have the same operation type and in the same name space will have one or more XPath expressions applied to them to determine if they contain a unique message identifier. The XPath expression is an expression that detects whether a file, xml document, or other message contains a particular unique message identifier. Information for individual messages as entered into user interface is illustrated in the user interface of FIG. 15 and discussed in more detail below. Other data which may be received for defining individual business transaction messages may include an analysis type, an identification of a field to place a unique message identifier, and other data.

Figure 15:
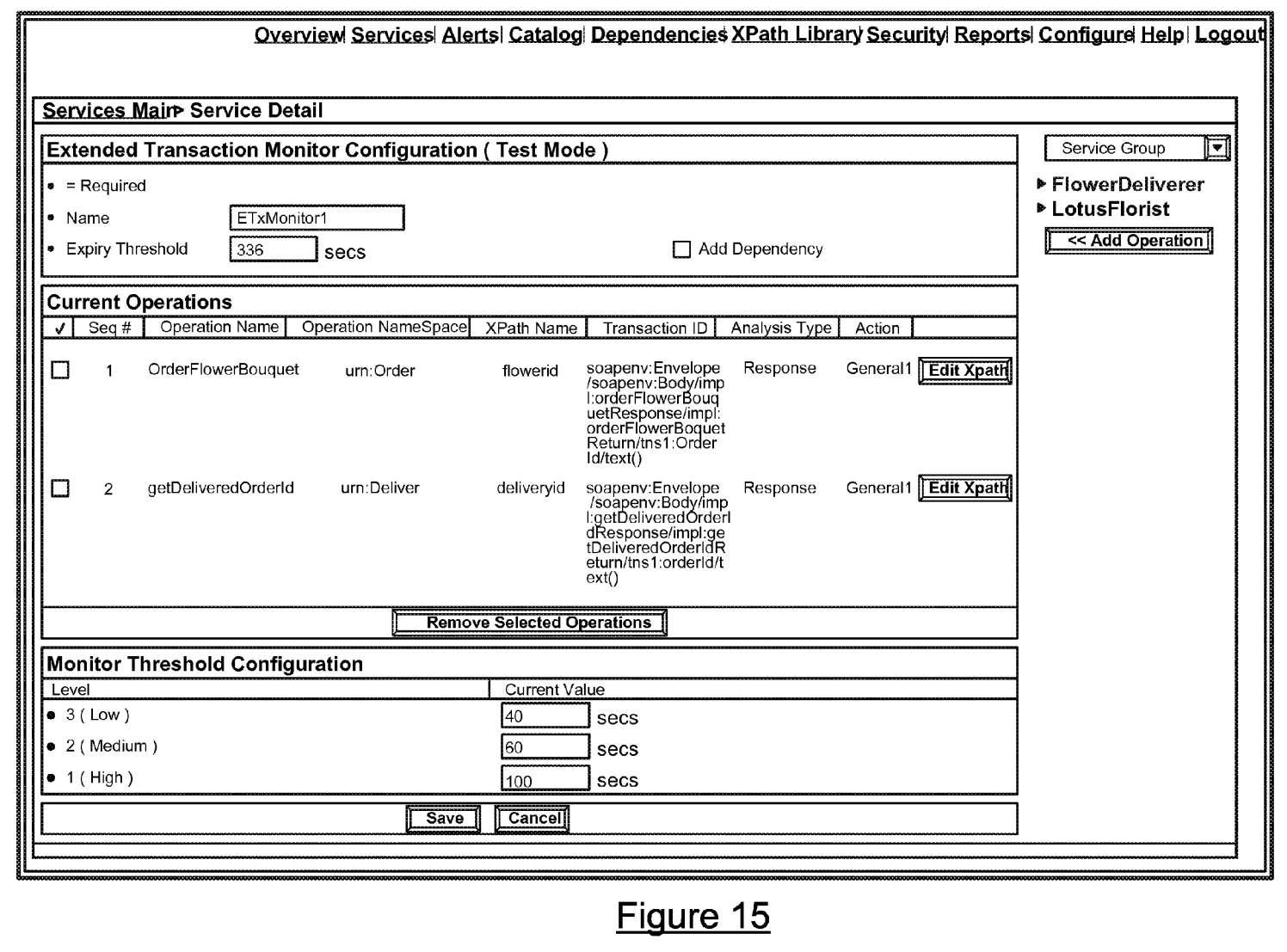

The unique message identification data is received at step 750. This data includes a unique message identifier used to identify a message which is part of an extended business transaction at step 750. The unique message identifier is a string or other data that sufficiently identifies a message as being specific to a particular extended business transaction. The identifier should be chosen such that it will appear in the desired message of the extended business transaction but not in other messages, whether or not the other messages are in the same namespace and/or are of the same operation type. In the interface of FIG. 15, examples of a unique message identifier is shown in the transaction ID column.

Next, one or more time thresholds are received for the selected message at step 760. The time thresholds are used to set the status of an uncompleted transaction and indicate when an alert should be generated based on non-received message for an uncompleted transaction. For example, each message in the sequence of messages that form an extended business transaction may have three time thresholds. When the elapsed time from detecting the message becomes greater than one of the thresholds and the next message in sequence is not received, an alert or other action may be configured for the message and business transaction. An action is then configured for each time threshold, if any, at step 770. In this embodiment, an action may be configured to be taken upon generation of an alert for each message or exceeding a time threshold. For example, the action may be generating an email, paging an administrator, creating and transmitting a text message or some other action.

The data for the selected message is saved at step 780. In some embodiments, the data may be saved within table 362 of repository 360 by extended business transaction manager 350. After saving the data, a determination is made by manager 350 as to whether more messages should be added or modified for the business transaction. If more messages should be added or modified, the next message is selected at step 792 and the method returns to step 740. If additional messages do not need to be added or modified, the method of FIG. 7 is complete at step 794.

Figure 8:
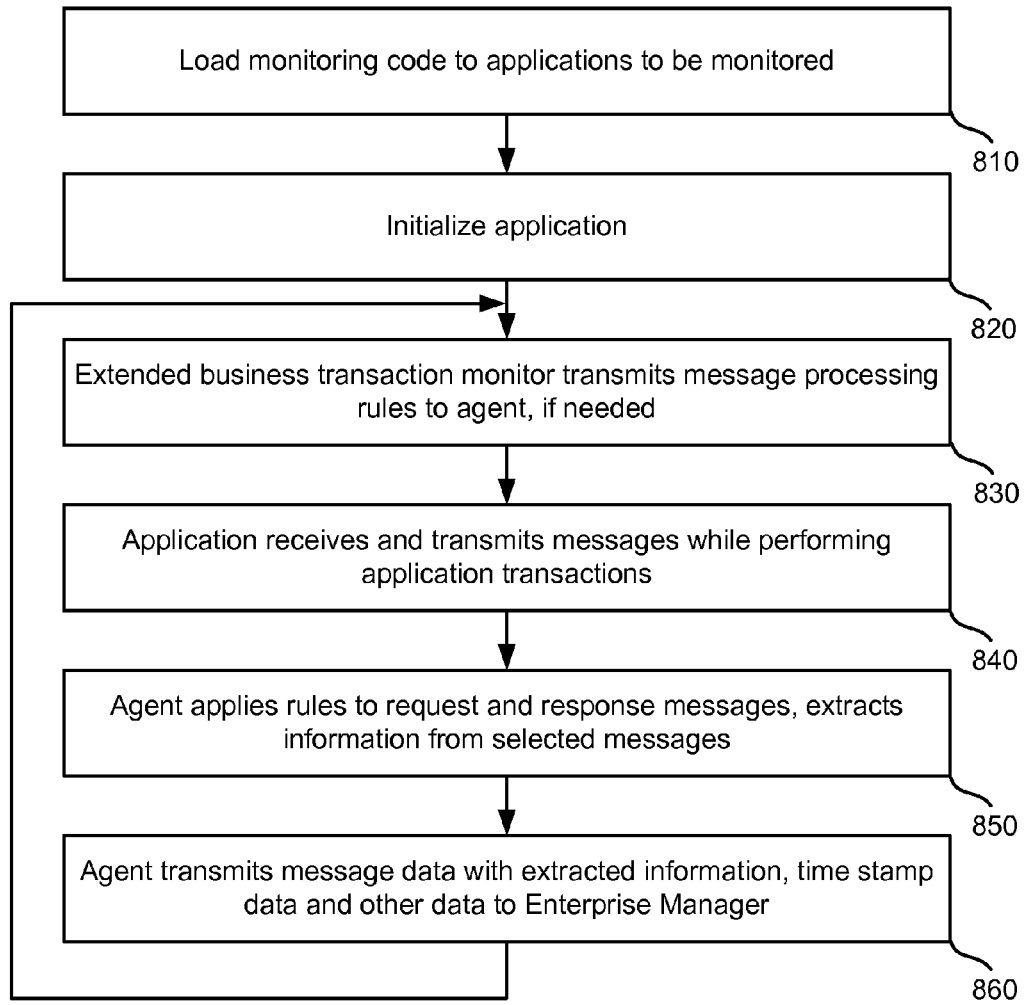
FIG. 8 is a flow chart of an embodiment of a method for monitoring a system to detect an extended business transaction.

FIG. 8 is a flow chart of an embodiment of a method for monitoring a system to detect an extended business transaction. In some embodiments, the method of FIG. 8 provides more detail for step 620 of the method of FIG. 6. First, monitoring code is loaded to applications to be monitored at step 810. In some embodiments, the monitoring code is loaded by instrumenting bytecode of one or more applications to add code for one or more agents and probes to the application. After loading the monitoring code, applications are initialized at step 820. An extended business transaction manager then transmits message processing rules to one or more agents at step 830, if needed. In some embodiments, the agents may already have access to the message processing rules. Sending message processing rules may include sending one or more XPath expressions, one for each message operation to apply against application messenger, to each agent in the application.

Next, the application receives and transmits messages while performing application transactions at step 840. As discussed above, an application transaction is comprised of a request-response pair of messages. In some embodiments, the messages may be in SOAP format or some other format. An agent 334 within application 332 applies the rules received from enterprise manager 340 (configured by extended transaction manger 350) to the request and response messages received and transmitted by the application and extracts information from selected messages at step 850. The agent may apply one or more filters to sent or received messages to determine whether or not to apply an XPath expression to a message. When a message satisfies any filters and rules applied to the message, the agent extracts information from the message. After identifying a message that satisfies the filters and XPath expression rules, the agent transmits message data with extracted information, time stamp data and other data to enterprise manager 340 at step 860. The information extracted by an agent may include a unique identifier used to identify the message. A unique identifier is listed as a transaction ID in the user interface of FIG. 15. In some embodiments, data is sent by the agent to enterprise manager 340 periodically, such as every 15 seconds. The enterprise manager receives the data from one or more agents and transmits the data to extended business transaction manager 350. The manager stores the data at repository 360 in table 362. The method of FIG. 8 then returns to step 830 where any rule updates are provided to any agents if needed.

Figure 9:
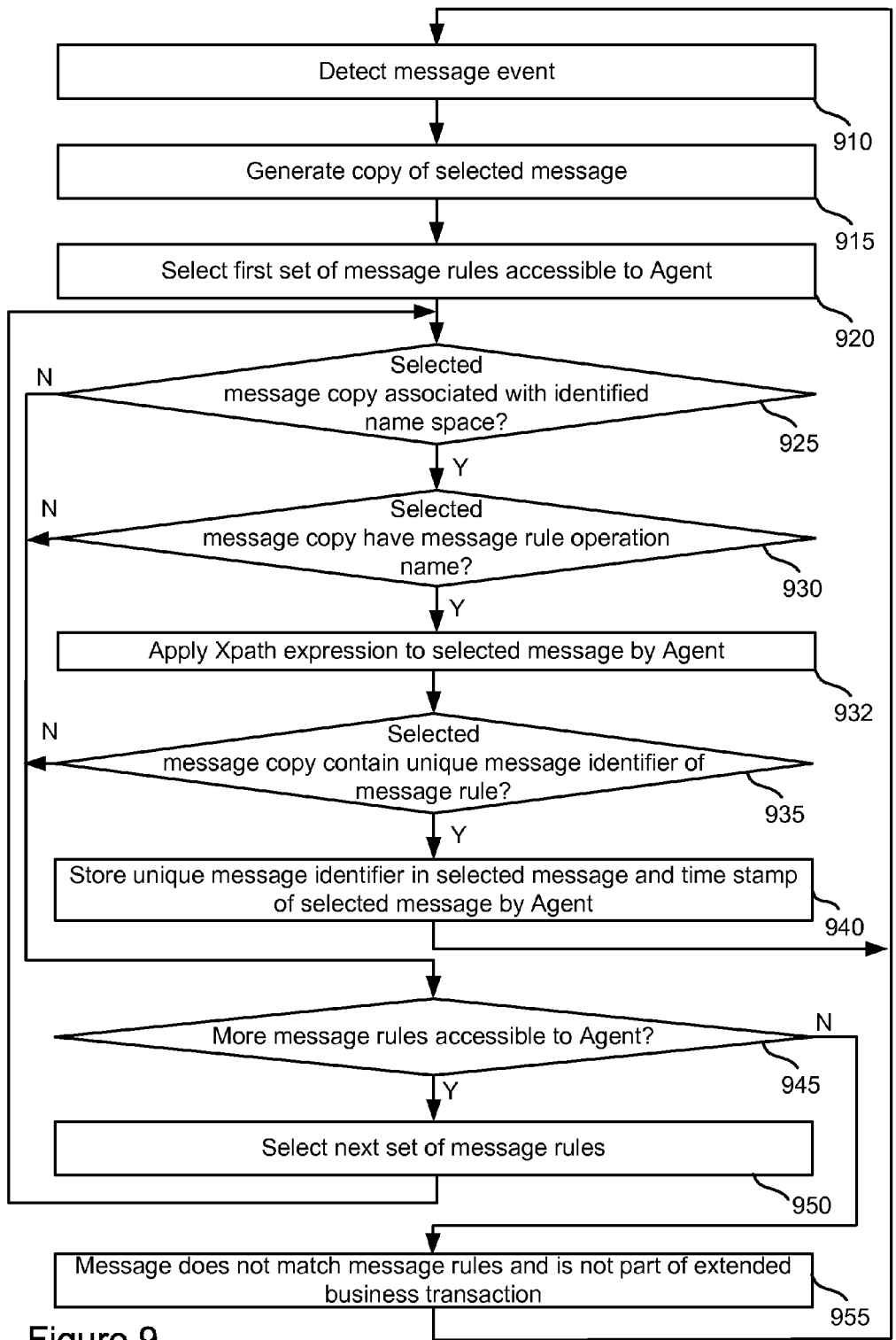
FIG. 9 is a flow chart of an embodiment of a method for detecting and extracting information from selected messages.

FIG. 9 is a flow chart of an embodiment of a method for detecting and extracting information from selected messages. In some embodiments, the method of FIG. 9 provides more detail for step 850 of the method of FIG. 8. First, a message event is detected at step 910. In operation, probe code inserted into an application intercepts a request or response message at step 910. Next, a copy of the selected message is created at step 915. Generating a copy of the message is performed by either the agent and/or a probe which intercepts the message.

After making a copy of the message, agent 334 will apply message detection rules to the message to determine if the message is part of an extended business transaction. The first set of message rules accessible to the agent is selected at step 920. In some embodiments, the agent locally stores rules for detecting whether a message is part of an extended business transaction and accesses the first message rule at step 920.

A determination is made as to whether a selected message is associated with a particular name space at step 925. A specified name space is used to remove messages from being considered as candidates for being part of a business transaction. If the selected message is within the associated name space, then the method of FIG. 9 continues to step 930. If the selected message does not have the name space, the method of FIG. 9 continues to step 945.

A determination is made as to whether the selected message has a message rule operation name at step 930. A specified operation name is used to remove messages as candidates if they do not have the specified operation name. If the message does not contain the specified operation name, the method of FIG. 9 continues to step 945. If the message copy does contain the specified message operation name, an XPath expression is applied to the message by the agent at step 932. Applying the XPath expression to the message enables the XPath expression to search through the selected message.

After applying the XPath expression, a determination is made as to whether the selected message contains a unique message identifier contained in the XPath expression at step 935. (the unique message identifier received by the agent at step 750) If the message does not contain the unique message identifier, the method of FIG. 9 continues to step 945. If the message does contain the unique message identifier contained in the XPath expression, the unique message identifier a time stamp for the selected message is stored by the agent. In some embodiments, the unique message identifier is temporarily stored locally to the agent before being sent to enterprise manager 340. After storing the unique message identifier, the method of FIG. 9 returns to step 910.

If the message is determined not to match the selected message rule, a determination is made by the agent as to whether more message rules are accessible to the agent at step 945. If no further message rules exist to be applied to the message, the message does not match the message rule sets and is not part of an extended business transaction at step 955. The method of FIG. 9 then returns to step 910 where it awaits the next transmitted message corresponding to a message event. If more message rules do exist to apply against the message, the next rule is selected at step 950 and the method of FIG. 9 returns to step 925.

Figure 10:
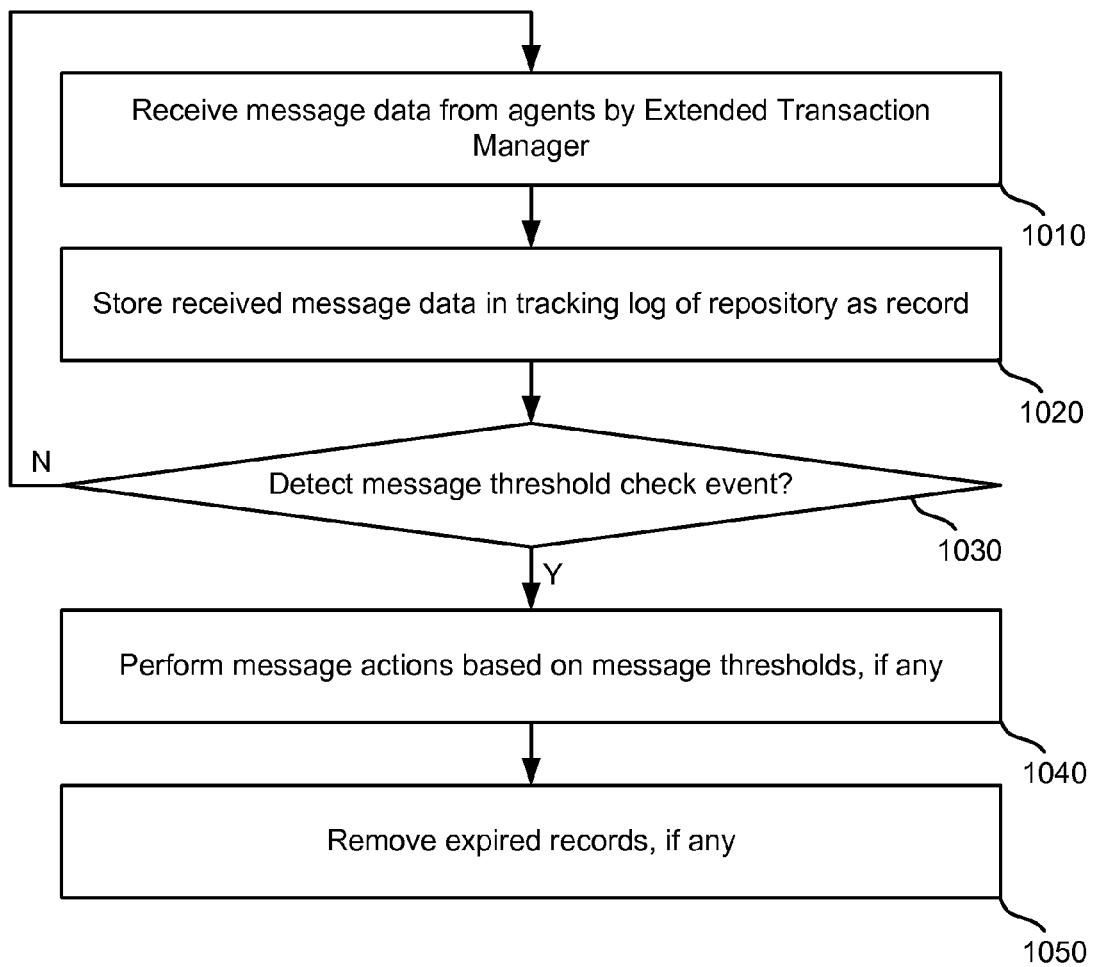
FIG. 10 is a flow chart of an embodiment of a method for storing and correlating performance data for selected messages.

FIG. 10 is a flow chart of an embodiment of a method for storing and correlating performance data for selected messages. In some embodiments, the method of FIG. 10 provides more detail for step 630 of the method of FIG. 6. First, message data is received from one or more agents by extended business transaction manager 350 at step 1010. The data may be sent by one or more agents to Enterprise Manager 340 which sends the data to Extended Transaction Manager 350. The received message data is then stored in a tracking log table of the repository at step 1020. The schema for the tracking log table is illustrated in FIG. 5 and discussed above. After storing the received message data, a determination is made as to whether a message threshold check event is detected at step 1030. In some embodiments, a background thread may be executed every 15 minutes, or at some other interval, to check message thresholds for the most recent message in an uncompleted extended business transaction. If a message threshold check event is not detected at step 1030, the method of FIG. 10 returns to step 1010 where additional message data may be received from agents.

If a message threshold check event is detected, message actions are configured based on the message thresholds, if any, at step 1040. The message actions may include setting a status level of an incomplete message, configuring alert data, or some other action. Configuring message actions is discussed in more detail below with respect to FIG. 11. After configuring the message actions, any expired records are removed, if any, at step 1050. Removing expired records prevents the data repository from getting too big and thereby degrading performance of the repository. In some embodiments, steps 1040 and 1050 are performed by a background thread that periodically accesses data in tables 362. Removing expired records from repository 360 is discussed in more detail below with respect to the method of FIG. 10.

Figure 11:
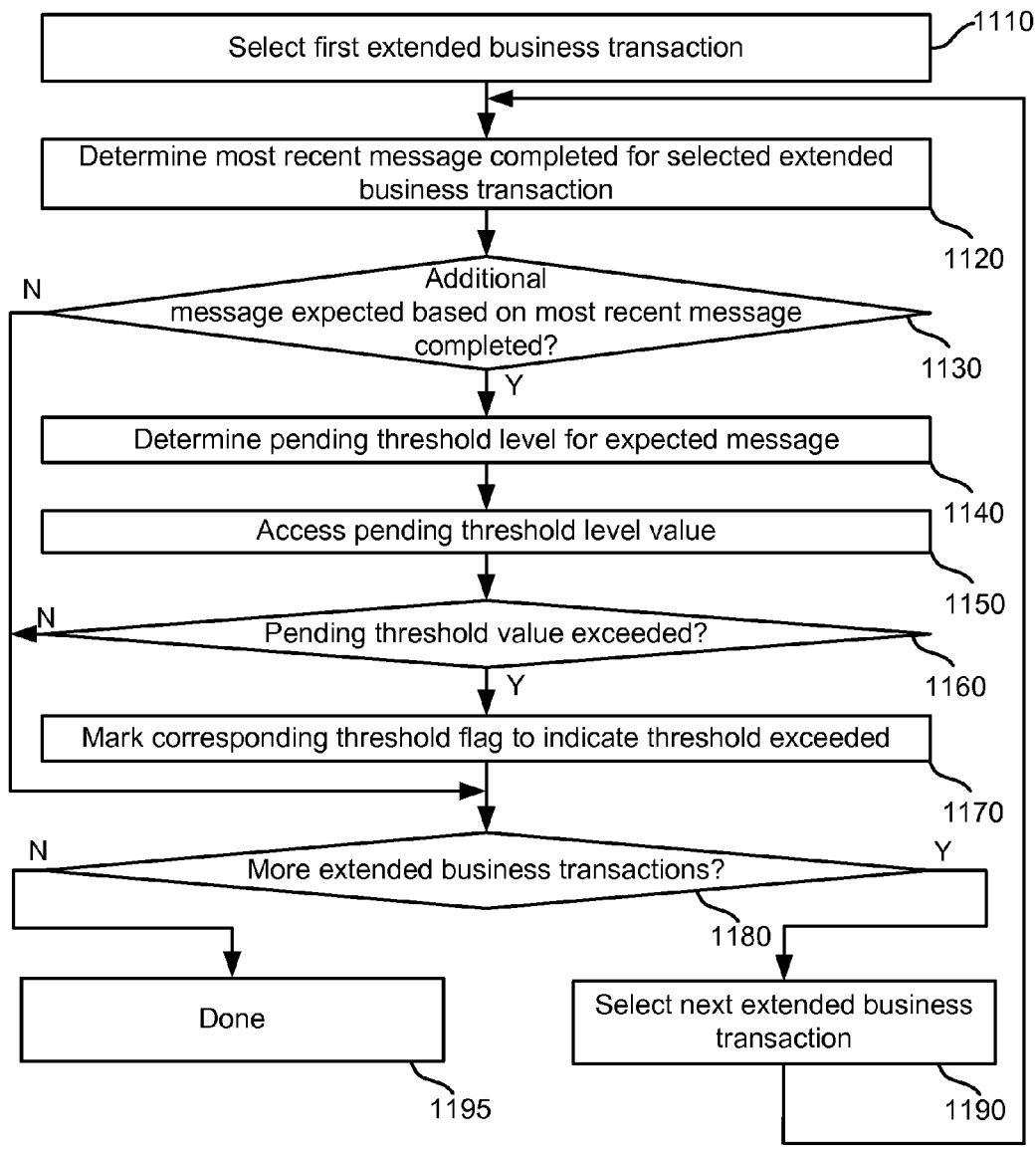
FIG. 11 is a flow chart of an embodiment of a method for configuring message actions.

FIG. 11 is a flow chart of an embodiment of a method for configuring message actions. In some embodiments, the method of FIG. 11 provides more detail for step 1040 of the method of FIG. 10. In some embodiments, the method of FIG. 11 is performed by a background thread which accesses data in the transaction track log table of FIG. 5 and processes the logged data. First, a first extended business transaction is selected from the track log table at step 1110. The first extended business transaction is selected by the extended business transaction manager 350. Next, the most recent message completed is determined for the selected extended business transaction at step 1120. The tracking log contains data which indicates messages that have been detected. Determining the most recent message completed for an extended business transaction is determined by selecting the message with the highest sequence number associated with the extended business transaction ID.

Next, a determination is made as to whether additional messages are expected based on the most recent message completed at step 1130. The background thread may compare the most recent message to the number of messages in the sequence to determine if more messages are expected. If no further messages are expected, then the method of FIG. 11 continues to step 1180. If additional messages are expected, the pending threshold level for the expected message is determined at step 1140. The pending threshold level is the first threshold for the extended business transaction for which an action has not yet been taken. For example, a message of an extended business transaction may have three time thresholds of one day, two days and three days. The first pending threshold for the message is a time period of one day. After the one day time period has passed and the next message has not been received, the next pending threshold is two days. If the next message in the extended business transaction message sequence has not been received in two days, the last pending threshold would be three days.

The pending threshold level value is then accessed at step 1150. The threshold value time period may be accessed from a transaction monitor table by the background thread. After accessing the pending threshold, a determination is made as to whether the pending threshold value time period is exceeded at step 1160. The threshold time period is exceeded if the time elapsed since the selected message was detected or sent/received has exceeded the threshold time. If the threshold value has not been exceeded, the method of FIG. 11 continues to step 1180. If the threshold value has been exceeded, a corresponding threshold flag is marked to indicate that the threshold is exceeded at step 1170 and the method of FIG. 11 continues to step 1180. Setting the threshold flag may include setting a severity 1 alerted, severity 2 alerted or severity 3 alerted value in the transaction track log table.

A determination is made as to whether more extended business transactions exist to be processed at step 1180. If no further extended business transactions exist, the method of FIG. 11 is done. If more extended business transactions exist, the next extended business transaction is selected at step 1190 and the method of FIG. 11 returns to step 1120.

Figure 12:
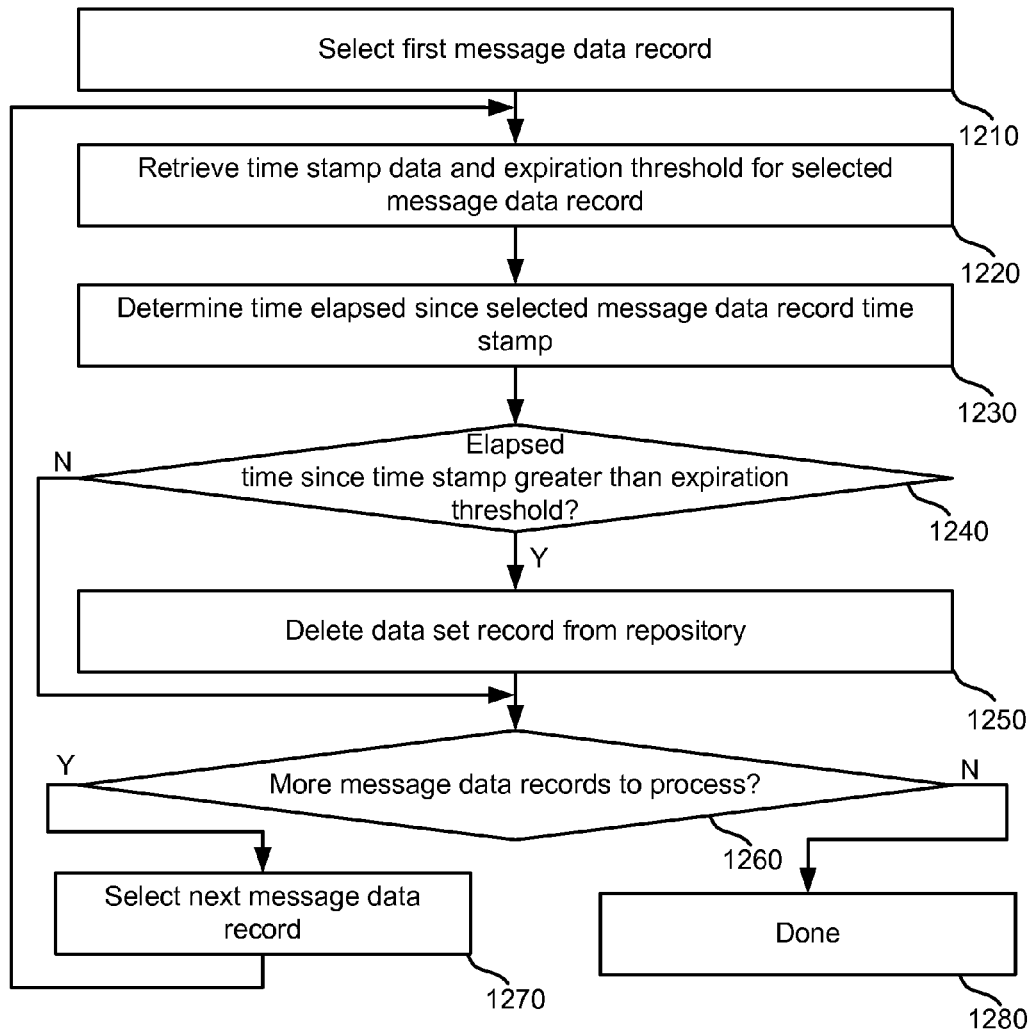
FIG. 12 is a flow chart of an embodiment of a method for removing expired extended business transaction data from a data store.

FIG. 12 illustrates a flow chart of an embodiment of a method for removing expired extended business transaction data from a data store. The method of FIG. 12 provides more detail for step 1050 of the method of FIG. 10. In some embodiments, a background thread executing on extended transaction manger 350 performs the method of FIG. 12. First, a first message data record is selected at step 1210. The message data record is selected from the transaction track log table by the thread. Next, time stamp data and expiration threshold data for a selected message data record is retrieved at step 1220. The time elapsed since the time stamp for the selected message record is then determined at step 1230. A determination is then made as to whether the elapsed time since the time stamp is greater than the expiration threshold at step 1240. If the elapsed time is not greater than the expiration threshold, the method of FIG. 12 continues to step 1260. If the elapsed time since the time stamp is greater than the expiration threshold, the data record is deleted from the repository at step 1250. After deleting the data record, the method of FIG. 12 continues to step 1260 where a determination is made as to whether more message data records exist to be processed. If no further message data records exist to be processed, then the method of FIG. 12 is complete is step 1280. If additional message records do exist to be processed, the next message data record is selected at step 1270 and the method of FIG. 12 returns to step 1220.

Figure 13:
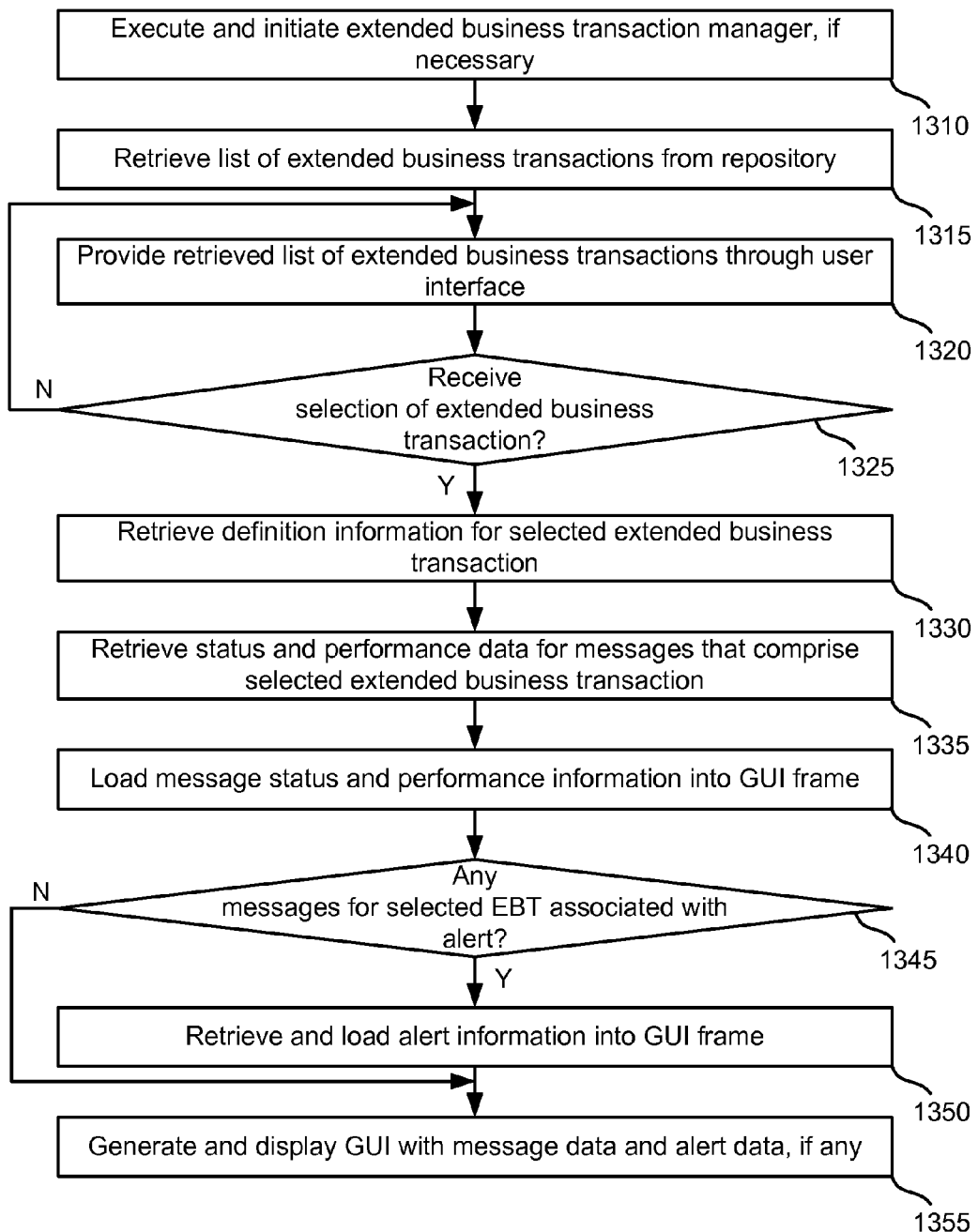
FIG. 13 is a flow chart of an embodiment of a method for implementing a user interface to manage extended business transaction monitoring.

FIG. 13 is a flow chart of an embodiment of a method for implementing a user interface to manage extended business transaction monitoring. In some embodiments, the method of FIG. 13 provides more detail for step 640 of the method of FIG. 6. First, extended business transaction manager 350 is executed and initiated at step 1310 if necessary. A list of extended business transactions is then retrieved by manager 350 from repository 360 at step 1315. The retrieved list of extended business transactions is then provided to the user through user interface 355 at step 1320. The user may then select one or more extended business transactions. If the selection of an extended business transaction is received at step 1325, definition information is retrieved for the selected extended business transaction at step 1330. If the selection is not received at step 1325, the method of FIG. 13 returns to step 1320.

After retrieving definition information, the status and performance data for messages that comprise selected extended business transactions are retrieved at step 1335. The message status and performance information are then loaded into the UI frame at step 1340 and a determination is made as to whether any messages for the selected electronic business transaction are associated with an alert at step 1345. If no messages are associated with an alert, the user interface is generated and displayed with the message data at step 1355. If alerts are associated with any message for the selected electronic business transaction, the alert information is retrieved and loaded into the user interface frame at step 1340. The user interface is then generated and displayed with the message data and alert data at step 1355. An example of a user interface for reporting data is illustrated in FIG. 16.

FIG. 14 is an example of an interface for defining an extended business transaction. In some embodiments, the user interface of FIG. 14 may be used to implement step 720 of the method of FIG. 7. The interface of FIG. 14 includes portions for showing extended transaction monitor configuration, current operations to perform on messages and a section for setting monitoring thresholds. The extended transaction monitor configuration allows a user to provide a name of the extended business transaction, its expiry threshold, and other data. There are currently no operations listed in the example interface and the monitor threshold configuration indicates default current values for three levels of thresholds or alerts for applying towards stored record data.

FIG. 15 is an example of an interface for configuring one or more operations to detect one or more messages. The interface of FIG. 15 includes fields and information for the extended business transaction as well as data for messages which have been defined under the current operations section. For example, the current operations section includes data of sequence number, operation name, operation name space, XPath name, transaction ID, an access type and action. Each XPath may also be edited by selecting the edit XPath button within the interface.

Figure 16:
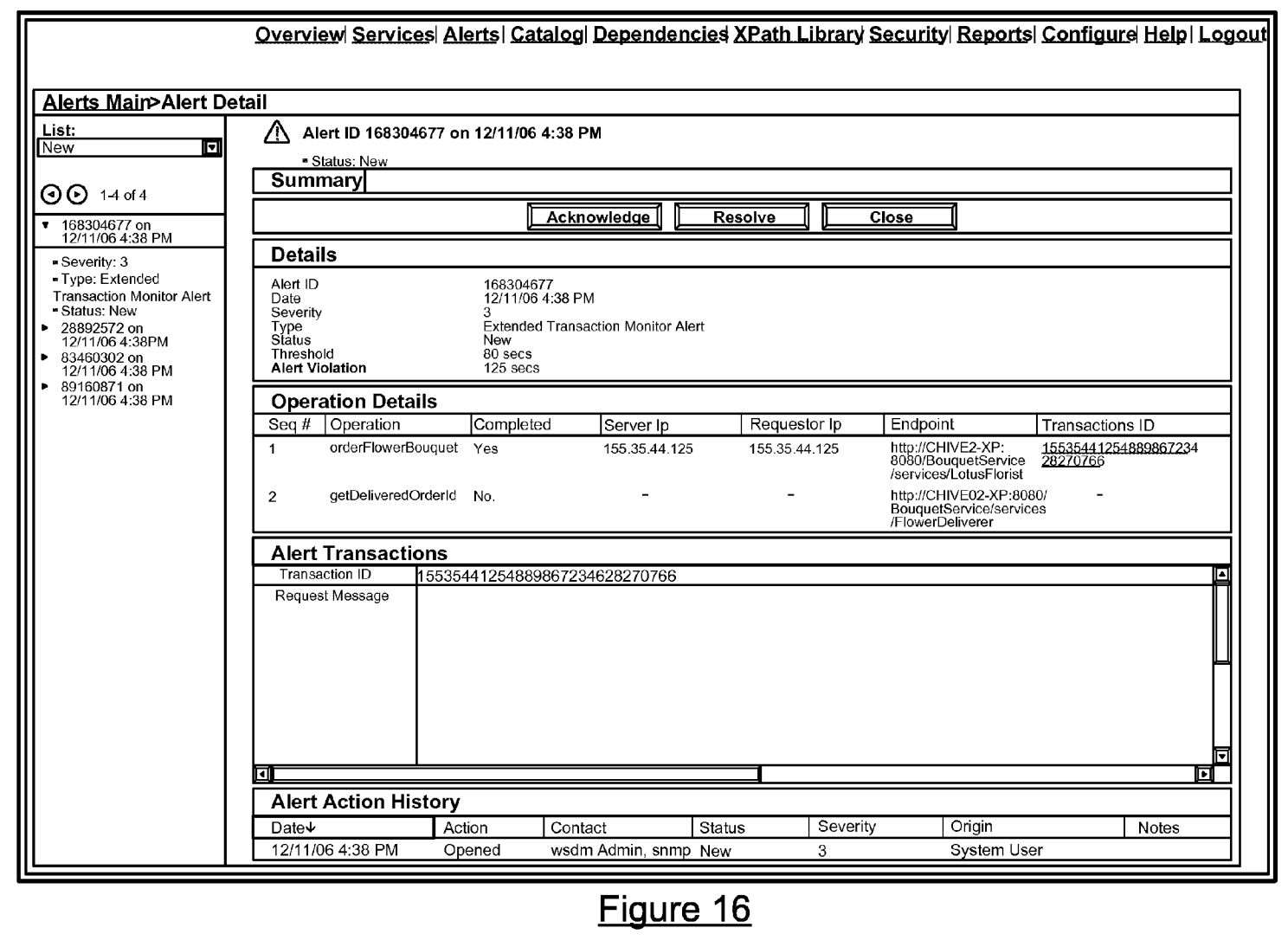

FIG. 16 is an example of an interface for displaying information for an extended business transaction being monitored. The interface of FIG. 16 includes a summary portion, details of an extended business transaction, operation details and alert transactions. The details portion of the interface indicates an alert ID, a severity of the alert, the type of alert and status of alert and the threshold which would violate it. The operation details indicate information for each defined operation for detecting a message, such as the sequence of each operation, an operation name, an indication of whether or not the operation is complete, a server IP of the server monitor and requester IP, and endpoint and a transaction ID.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for monitoring a transaction, comprising:
  monitoring messages which are received and transmitted by at least one application, to detect a correspondence with at least first and second message definitions of a business transaction, the first message definition includes an associated name, and an associated statement which contains an identifier of the business transaction, and the second message definition includes an associated name, and an associated statement which contains the identifier;
  the monitoring includes, for at least one message:
    determining whether the message contains a name which matches the associated name of the first message definition, and if the message contains the name which matches the associated name of the first message definition, executing the associated statement of the first message definition to determine whether the message contains an identifier which matches the identifier of the business transaction, and if the message contains the identifier which matches the identifier of the business transaction, storing data which indicates that the message matches the first message definition and storing a time stamp of the message; and
    determining whether the message contains a name which matches the associated name of the second message definition, and if the message contains the name which matches the associated name of the second message definition, executing the associated statement of the second message definition to determine whether the message contains an identifier which matches the identifier of the business transaction, and if the message contains the identifier which matches the identifier of the business transaction, storing data which indicates that the message matches the second message definition and storing a time stamp of the message;
  correlating performance data for one or more of the messages which correspond to the first message definition with performance data for one or more of the messages which correspond to the second message definition; and
  reporting results for the correlated performance data.

2. The method of claim 1, wherein:
the first message definition includes an associated sequence identifier which identifies an associated position within the business transaction; and
the second message definition includes an associated sequence identifier which identifies an associated position within the business transaction.

3. The method of claim 1, wherein:
the messages which match the first and second message definitions are identified as being part of the business transaction; and
messages which do not match the first and second message definitions are not identified as being part of the business transaction.

4. The method of claim 1, further comprising:
setting a plurality of time thresholds associated with completing two consecutive messages; and
assigning an action to perform upon exceeding each threshold.

5. The method of claim 1, wherein:
the first message definition and the second message definition are provided by a user through a user interface.

6. The method of claim 1, further comprising:
based on the first message definition and the second message definition, generating a set of rules for use in the monitoring; and
sending the set of rules to an agent which is inserted into the at least one application.

7. The method of claim 1, wherein:
the first message definition includes an associated name space;
the second message definition includes an associated name space; and
for the at least one message:
  the determining of whether the message contains the name which matches the associated name of the first message definition is performed in response to determining that the message contains the name space which matches the associated name space of the first message definition; and
  the determining of whether the message contains the name which matches the associated name of the second message definition is performed in response to determining that the message contains the name space which matches the associated name space of the second message definition.

8. The method of claim 1, wherein:
the at least one application comprises first and second applications;
each of the one or more messages which correspond to the first message definition is a request or response of a request-response pair of messages for a transaction at the first application;
each of the one or more messages which correspond to the second message definition is a request or response of a request-response pair of messages for a transaction at the second application; and
a unique identifier is contained within each of the one or more messages which correspond to the first message definition and within a corresponding message of the one or more messages which correspond to the second message definition.

9. The method of claim 1, wherein:
at least one of the one or more messages which corresponds to the first message definition is separated by an extended period of time of at least several minutes from a corresponding message of the one or more messages which correspond to the second message definition.

10. The method of claim 1, wherein:
the first message definition includes an associated indication of whether the associated statement is to be run against a request message or a response message.

11. The method of claim 1, wherein:
the first message definition identifies an associated action for an agent to take as a result of executing the associated statement, the associated action involves placing a result of executing the associated statement into a particular field of a record which is sent to a manager.

\* \* \* \* \*